(12) United States Patent
Zhang et al.

(10) Patent No.: US 11,388,090 B2
(45) Date of Patent: Jul. 12, 2022

(54) BANDWIDTH MEASUREMENT METHOD AND MEASUREMENT DEVICE

(71) Applicant: HUAWEI TECHNOLOGIES CO., LTD., Shenzhen (CN)

(72) Inventors: Lvchuan Zhang, Dongguan (CN); Xin Liu, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/186,696

(22) Filed: Feb. 26, 2021

(65) Prior Publication Data

US 2021/0184969 A1 Jun. 17, 2021

Related U.S. Application Data

(63) Continuation of application No. PCT/CN2018/103011, filed on Aug. 29, 2018.

(51) Int. Cl.
*H04L 45/50* (2022.01)
*H04L 43/0882* (2022.01)
*H04L 43/50* (2022.01)

(52) U.S. Cl.
CPC ........ *H04L 45/507* (2013.01); *H04L 43/0882* (2013.01); *H04L 43/50* (2013.01)

(58) Field of Classification Search
CPC ... H04L 45/507; H04L 43/0882; H04L 43/50; H04L 43/0858; H04L 43/10;

(Continued)

(56) References Cited

U.S. PATENT DOCUMENTS

| 2012/0051745 A1 | 3/2012 | Srinivasan et al. |
| 2016/0218943 A1 | 7/2016 | Djukic et al. |

(Continued)

FOREIGN PATENT DOCUMENTS

| CN | 1815970 A | 8/2006 |
| CN | 101013995 A | 8/2007 |

(Continued)

OTHER PUBLICATIONS

N. Kumar, Ed. et al.,"Label Switched Path (LSP) Ping/Traceroute for Segment Routing (SR) IGP-Prefix and IGP-Adjacency Segment Identifiers (SIDs) with MPLS Data Planes",Internet Engineering Task Force (IETF);Request for Comments: 8287;Dec. 2017,Total 25 Pages.

(Continued)

*Primary Examiner* — Joe Chacko
(74) *Attorney, Agent, or Firm* — Hauptman Ham, LLP

(57) ABSTRACT

A bandwidth measurement method includes sending a first test packet on a test path that includes a to-be-measured link, sending a second test packet on the test path, setting at least one of a quantity of label layers in a first segment routing (SR) label or a quantity of label layers in a second SR label as a reference quantity of label layers for bandwidth measurement, and determining an available bandwidth on the to-be-measured link based on the reference quantity of label layers in response to the to-be-measured link failing to be congested with first test packets and being congested with second test packets. The first test packet includes the first SR label that indicates a forwarding relationship of the first test packet on the to-be-measured link. The second test packet includes a second SR label that indicates a forwarding relationship of the second test packet on the to-be-measured link.

20 Claims, 6 Drawing Sheets

(58) Field of Classification Search
CPC ....... H04L 45/125; H04L 45/34; H04L 45/50; H04L 47/11; H04L 47/283; H04L 47/29
See application file for complete search history.

(56) References Cited

U.S. PATENT DOCUMENTS

| | | |
|---|---|---|
| 2016/0344608 A1 | 11/2016 | Siemens et al. |
| 2017/0012827 A1 | 1/2017 | Ashwood-Smith |

FOREIGN PATENT DOCUMENTS

| | | |
|---|---|---|
| CN | 101051959 A | 10/2007 |
| CN | 101667890 A | 3/2010 |
| CN | 102201947 A | 9/2011 |
| CN | 103259696 A | 8/2013 |
| CN | 103401730 A | 11/2013 |
| CN | 103701626 A | 4/2014 |
| CN | 103997640 A | 8/2014 |
| CN | 104869032 A | 8/2015 |
| CN | 105052107 A | 11/2015 |
| CN | 103053133 B | 7/2016 |
| CN | 106487605 A | 3/2017 |
| CN | 106487686 A | 3/2017 |
| CN | 107294748 A | 10/2017 |
| CN | 107508762 A | 12/2017 |
| CN | 107566274 A | 1/2018 |
| WO | 2011006372 A1 | 1/2011 |
| WO | 2015172363 A1 | 11/2015 |

OTHER PUBLICATIONS

S. Sivabalan et al.,"PCEP Extensions for Segment Routing;draft-ietf-pce-segment-routing-11",PCE;Internet-Draft; Intended status: Standards Track;Nov. 20, 2017,Total 22 Pages.

Wu Sunxian,"A Probe-based and IVIeasurement-based Admission Control Scheme for DiffServ Network: Design and Implement",Jilin University,Apr. 29, 2005,with an English abstract,total 104 pages.

C. Filsfils, Ed. et al.,"Segment Routing Architecture",Internet Engineering Task Force (IETF);Request for Comments 8402,Jul. 2018,Total 32 Pages.

Liu Xin,"Research on Performance Evaluation of Communication Network",Xidian University,Jan. 2007,with an English abstract-,total 64 pages.

Sarvesh Bidkar et al.,"Field Trial of a Software Defined Network (SDN) using Carrier Ethernet and Segment Routing in a Tier-1 Provider", Globecom 2014—Optical Networks and Systems Symposium,total 7 pages.

Chinese Notice of Allowance issued in corresponding Chinese Application No. 201880096936.5, dated Jul. 28, 2021, pp. 1-7.

International Search Report issued in corresponding International Application No. PCT/CN2018/103011, dated Apr. 28, 2019, pp. 1-8.

BANDWIDTH MEASUREMENT METHOD AND MEASUREMENT DEVICE

CROSS-REFERENCE TO RELATED APPLICATIONS

This application is a continuation of International Application No. PCT/CN2018/103011, filed on Aug. 29, 2018, the disclosure of which is hereby incorporated by reference in its entirety.

TECHNICAL FIELD

This application relates to the field of network technologies, and in particular, to a bandwidth measurement method and a measurement device.

BACKGROUND

With the continuous development of network technologies, an existing network scale keeps expanding, and a network becomes increasingly heterogeneous and complex. Accurate and real-time network status, especially network bandwidth information, plays an important role in improving network performance and optimizing service quality. A network bandwidth is used to indicate a data transmission rate on a link or path, and is measured as a bit rate. A transmit rate of a device may also be referred to as a transmit bandwidth. A bandwidth resource is a network resource of paramount importance, and is one of major factors in performance of a transmission path.

Existing bandwidth measurement may be implemented based on a probe rate model (Probe Rate Model, PRM). A basic principle of the PRM is to continuously change a transmit rate of a probe packet to find a turning point at which the transmit rate matches an arrival rate (which may also be referred to as a receive rate), and use an average arrival rate of a corresponding probe packet as an estimated value of an available bandwidth on a to-be-measured link. It is assumed that the transmit rate of the probe packet is Rs, the receive rate at which the probe packet reaches a destination end is Rr, and the available bandwidth on the to-be-measured link is C. The following cases may occur during probing:

(1) When the receive rate Rr at the destination end is equal to the transmit rate Rs at a transmit end, a test path is not congested, and Rs is less than or equal to the available bandwidth C.

(2) When the receive rate Rr at the destination end is less than the transmit rate Rs at a transmit end, a test path is congested, and Rs is greater than the available bandwidth C.

It can be learned that, a bandwidth at a moment when a smooth test path becomes congested, that is, a turning point at which a receive-end rate changes from equal to a transmit-end rate to less than the transmit-end rate, can be used as the estimated value of the available bandwidth.

However, when a maximum transmit bandwidth at the transmit end is less than the available bandwidth on the to-be-measured link, that is, the case (1), a bandwidth on the to-be-measured link cannot be accurately measured. When an available bandwidth on another link on the test path is less than the available bandwidth on the to-be-measured link, a probe packet transmitted at a high bandwidth is congested on the another link. Consequently, a bandwidth on the to-be-measured link cannot be accurately measured either.

SUMMARY

A technical problem to be resolved in embodiments of this application is to provide a bandwidth measurement method and a measurement device, so as to accurately measure a bandwidth on a to-be-measured link.

According to a first aspect, an embodiment of this application provides a bandwidth measurement method, and the method may include:

sending, by a measurement device, a first test packet on a test path, where the first test packet includes a first segment routing SR label, the test path includes a to-be-measured link, and the first SR label indicates a forwarding relationship of the first test packet on the to-be-measured link;

sending, by the measurement device, a second test packet on the test path, where the second test packet includes a second SR label, the second SR label indicates a forwarding relationship of the second test packet on the to-be-measured link, and the second SR label and the first SR label have different quantities of label layers; and when the to-be-measured link is not congested with first test packets but congested with second test packets, using, by the measurement device, a quantity of label layers in the first SR label and/or a quantity of label layers in the second SR label as a reference quantity of label layers for bandwidth measurement, and determining an available bandwidth on the to-be-measured link based on the reference quantity of label layers.

Test packets with SR labels having different quantities of layers are sent to test the to-be-measured link, and different SR labels correspond to different forwarding relationships of test packets. A test packet can be forwarded for a plurality of times on the to-be-measured link by using segment routing and by changing a quantity of SR label layers. Therefore, when a maximum bandwidth at a transmit end is relatively small, an available bandwidth that is relatively large and that is on the to-be-measured link is accurately measured. Further, a case in which a bandwidth on another link on the test path is relatively small but the available bandwidth on the to-be-measured link is relatively large can also be addressed by changing the quantity of SR label layers for the to-be-measured link. Therefore, a bandwidth on the to-be-measured link is accurately measured.

In a possible implementation, the method further includes:

when sending the second test packet on the test path, measuring, by the measurement device, a second path delay in transmitting the second test packet on the test path; and when the second path delay is greater than a preset threshold, the measurement device determines that the to-be-measured link is congested with second test packets.

A path delay is measured and compared, to determine whether the to-be-measured link is congested. This facilitates easy bandwidth measurement, and enables the measurement easy to understand and simple to operate.

In a possible implementation, the method further includes:

if a difference between the quantity of label layers in the second SR label and the quantity of label layers in the first SR label is equal to 1, using, by the measurement device, the quantity of label layers in the second SR label as the reference quantity of label layers, and determining the available bandwidth on the to-be-measured link based on the reference quantity of label layers.

When a difference between the quantity of label layers in the second SR label and the quantity of label layers in the first SR label is equal to 1, the quantity of label layers in the first SR label corresponds to a congestion state, and the quantity of label layers in the second SR label corresponds to a non-congestion state, the available bandwidth on the to-be-measured link may be determined based on the quantity of label layers that corresponds to the congestion state. In this way, a result is relatively accurate.

In a possible implementation, the method further includes:

if a difference between the quantity of label layers in the second SR label and the quantity of label layers in the first SR label is greater than 1, sending, by the measurement device, a third test packet on the test path, where the third test packet includes a third SR label, the third SR label indicates a forwarding relationship of the third test packet on the to-be-measured link, and a quantity of label layers in the third SR label is greater than the quantity of label layers in the first SR label and less than the quantity of label layers in the second SR label; and when the to-be-measured link is congested with third test packets, and a difference between the quantity of label layers in the third SR label and the quantity of label layers in the first SR label is equal to 1, using, by the measurement device, the quantity of label layers in the third SR label as the reference quantity of label layers, and determining the available bandwidth on the to-be-measured link based on the reference quantity of label layers.

The quantity of label layers in the second SR label is adjusted to approach a congestion critical point, until a proper quantity of label layers in the third SR label is obtained. In this way, a more accurate measurement result can be obtained.

In some possible implementations, the method further includes:

determining, by the measurement device, a corresponding reference test packet based on the reference quantity of label layers, and reducing a transmit bandwidth for sending the reference test packet until a difference between a current path delay and a first path delay is less than or equal to a preset delay difference, where the first path delay is a path delay in transmitting the first test packet on the test path; and determining, by the measurement device, the available bandwidth on the to-be-measured link based on the reference quantity of label layers and a current transmit bandwidth.

After the reference quantity of label layers is determined, the transmit bandwidth is reduced to further approach the congestion critical point. In this case, a measurement result can be further fine-tuned to obtain a more accurate measurement result.

In a possible implementation, the determining, by the measurement device, the available bandwidth on the to-be-measured link based on the reference quantity of label layers and a current transmit bandwidth is performed based on the following formula:

$$BW = n \times bw, \text{ where}$$

BW is the available bandwidth on the to-be-measured link, n is the reference quantity of label layers, and bw is the current transmit bandwidth of the measurement device.

In a possible implementation, the using, by the measurement device, a quantity of label layers in the first SR label and a quantity of label layers in the second SR label as a reference quantity of label layers for bandwidth measurement, and determining an available bandwidth on the to-be-measured link based on the reference quantity of label layers includes:

determining, by the measurement device, an available bandwidth interval for the to-be-measured link based on the quantity of label layers in the first SR label and the quantity of label layers in the second SR label; and selecting a median value of the available bandwidth interval as the available bandwidth on the to-be-measured link.

In a possible implementation, the quantity of label layers in the first SR label or the quantity of label layers in the second SR label is adjusted by dichotomy; or the quantity of label layers in the first SR label or the quantity of label layers in the second SR label is adjusted by a preset variation.

In a possible implementation, when a variation of the second path delay relative to the first path delay reaches a preset variation threshold, or when a variation rate of the second path delay relative to the first path delay reaches a preset variation rate threshold, determining, by the measurement device, that the to-be-measured link is congested with second test packets, where the first path delay is a delay in transmitting the first test packet on the test path when the first test packet is sent.

According to a second aspect, an embodiment of this application provides a measurement device, and the measurement device may include:

a transceiver unit, configured to send a first test packet on a test path, where the first test packet includes a first segment routing SR label, the test path includes a to-be-measured link, and the first SR label indicates a forwarding relationship of the first test packet on the to-be-measured link, where the transceiver unit is further configured to send a second test packet on the test path, where the second test packet includes a second SR label, the second SR label indicates a forwarding relationship of the second test packet on the to-be-measured link, and the second SR label and the first SR label have different quantities of label layers; and a processing unit, configured to: when the to-be-measured link is not congested with first test packets but congested with second test packets, use a quantity of label layers in the first SR label and/or a quantity of label layers in the second SR label as a reference quantity of label layers for bandwidth measurement, and determine an available bandwidth on the to-be-measured link based on the reference quantity of label layers.

In a possible implementation, the processing unit is further configured to:

when the second test packet is sent on the test path, measure a second path delay in transmitting the second test packet on the test path; and when the second path delay is greater than a preset threshold, determine that the to-be-measured link is congested with second test packets.

In a possible implementation, the processing unit is further configured to:

if a difference between the quantity of label layers in the second SR label and the quantity of label layers in the first SR label is equal to 1, use the quantity of label layers in the second SR label as the reference quantity of label layers, and determine the available bandwidth on the to-be-measured link based on the reference quantity of label layers.

In a possible implementation, the transceiver unit is further configured to:

if a difference between the quantity of label layers in the second SR label and the quantity of label layers in the first SR label is greater than 1, send a third test packet on the test path, where the third test packet includes a third SR label, the third SR label indicates a forwarding relationship of the third test packet on the to-be-measured link, and a quantity of label layers in the third SR label is greater than the quantity of label layers in the first SR label and less than the quantity of label layers in the second SR label; and the processing unit is further configured to: when the to-be-measured link is congested with third test packets, and a difference between the quantity of label layers in the third SR label and the quantity of label layers in the first SR label is equal to 1, use the quantity of label layers in the third SR label as the reference quantity of label layers, and determine the available bandwidth on the to-be-measured link based on the reference quantity of label layers.

In a possible implementation, the processing unit is further configured to:

determine a corresponding reference test packet based on the reference quantity of label layers, and reduce a transmit bandwidth for sending the reference test packet until a difference between a current path delay and a first path delay is less than or equal to a preset delay difference, where the first path delay is a path delay in transmitting the first test packet on the test path; and determine the available bandwidth on the to-be-measured link based on the reference quantity of label layers and a current transmit bandwidth.

In a possible implementation, that the processing unit determines the available bandwidth on the to-be-measured link based on the reference quantity of label layers and a current transmit bandwidth is performed based on the following formula:

$$BW = n \times bw, \text{ where}$$

BW is the available bandwidth on the to-be-measured link, n is the reference quantity of label layers, and bw is the current transmit bandwidth of the measurement device.

In a possible implementation, the processing unit is further configured to:

determine an available bandwidth interval for the to-be-measured link based on the quantity of label layers in the first SR label and the quantity of label layers in the second SR label; and select a median value of the available bandwidth interval as the available bandwidth on the to-be-measured link.

According to a third aspect, an embodiment of this application provides a measurement device, and the measurement device may include:

a processor, a memory, and a bus, where the processor and the memory are connected by using the bus, the memory is configured to store a group of program code, and the processor is configured to invoke the program code stored in the memory to perform the step in the first aspect or any implementation of the first aspect in the embodiments of this application.

According to a fourth aspect, an embodiment of this application provides a computer-readable storage medium. The computer-readable storage medium stores an instruction, and when the instruction is run on a computer, the method in the first aspect or any implementation of the first aspect is implemented.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

The following describes embodiments of this application with reference to the accompanying drawings in the embodiments of this application.

The terms "including", "having", or any other variant thereof mentioned in the specification, the claims, and the accompanying drawings of this application are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
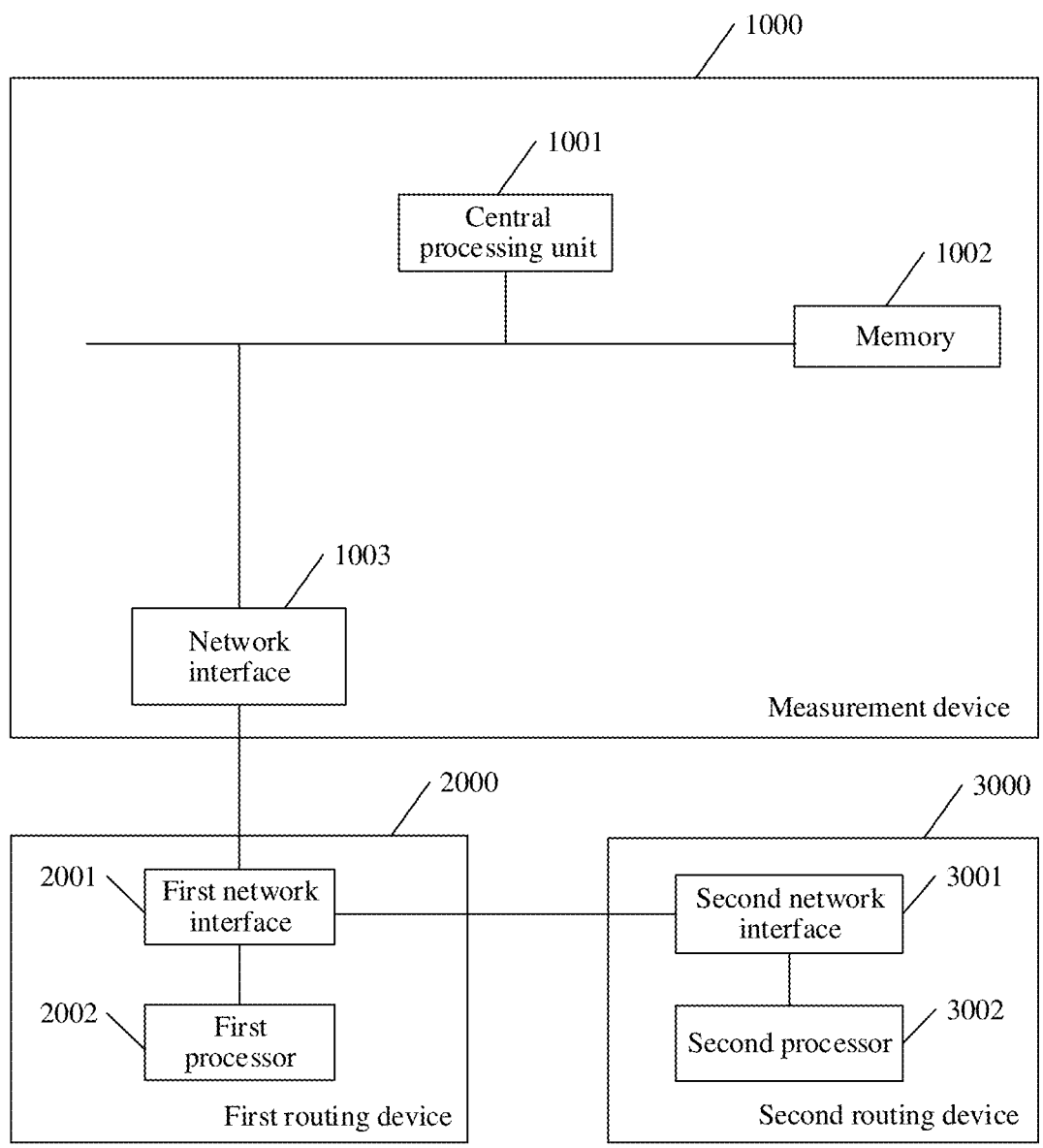
FIG. 1 is a schematic diagram of composition of a system architecture to which a bandwidth measurement method according to an embodiment of this application is applied.

FIG. 1 is a schematic diagram of composition of a system architecture to which a bandwidth measurement method according to an embodiment of this application is applied. The system architecture may include but is not limited to a measurement device 1000, a first routing device 2000, and a second routing device 3000.

The measurement device 1000 may be configured to send a test packet to the first routing device 2000 and the second routing device 3000 that are on a test path, so as to measure an available bandwidth on a link between the first routing device 2000 and the second routing device 3000.

The first routing device 2000 may be configured to forward the test packet based on path information in the test packet.

Similarly, the second routing device 3000 may be configured to forward the test packet based on the path information in the test packet.

The path information may be used to indicate a forwarding path of the test packet. For example, the path information is: <the first routing device 2000 to the second routing device 3000, the second routing device 3000 to the first routing device 2000, the first routing device 2000 to the second routing device 3000, the second routing device 3000 to the first routing device 2000>. Therefore, when receiving, for the first time, the test packet sent by the measurement device, the first routing device 2000 forwards the test packet to the second routing device 3000 based on a path forwarding sequence in the path information, and the second routing device 3000 forwards the test packet to the first routing device 2000 based on the path information. After receiving the test packet forwarded by the second routing device 3000 based on the path information, the first routing device 2000 forwards the test packet to the second routing device 3000 again based on the path information, and the second routing device 3000 forwards the test packet again to the first routing device 2000 based on the path information.

It should be noted that, for ease of description, FIG. 1 shows merely a to-be-measured link between two routing devices. In some possible cases, there may be more than two routing devices on a test path. The test path may include at least one to-be-measured link, and may further include some other links on which available bandwidths are known. This is not limited in the embodiments of this application.

The measurement device 1000 includes but is not limited to a central processing unit 1001 (Central Processing Unit, CPU), a memory 1002, a network interface 1003, and a user interface 1004.

The central processing unit 1001 may be configured to read a computer instruction and process data in computer software, and is a core component for reading an instruction from a computer system, and decoding and executing the instruction. Alternatively, the central processing unit 1001 may read data in the memory, perform corresponding processing on the data and output the data. For example, in this embodiment of this application, the central processing unit 1001 may obtain a test packet from another device or a server through the network interface 1003, and configure and modify the test packet based on a test program stored in the memory. Alternatively, the central processing unit 1001 may generate a test packet based on information about a routing device on a test path. Alternatively, the central processing unit 1001 may read a prestored test packet from the memory 1002, and configure and modify the prestored test packet. This is not limited in this embodiment of this application.

The memory 1002 may also be referred to as a storage medium, a storage apparatus, a storage device, or the like. The memory 1002 may include a high-speed random access memory (Random Access Memory, RAM), and may further include a non-volatile memory (non-volatile memory), for example, at least one magnetic disk memory. The magnetic disk memory may be configured to store an operating system, various application programs, and non-program data. Optionally, the memory 1002 may store, for example, network topology information (which is used to generate test path information) that may be related to the embodiments of this application. The central processing unit may read a program and run the program in a RAM (memory). The RAM may temporarily store the program read and executed by the central processing unit, and store data that is obtained after the program is executed and that needs to be sent.

The network interface 1003 is configured to send and receive data or a test packet.

Optionally, the measurement device 1000 may further include the user interface 1004 (not shown in FIG. 1). The user interface 1004 is configured to be connected to peripheral devices, such as a display and a keyboard, to assist a user in viewing information and performing an operation.

The first routing device 2000 may include a first network interface 2001 and a first processor 2002. The first network interface 2001 may be configured to communicate with another device, to forward data or a test packet. For example, the first network interface 2001 receives a test packet from the measurement device 1000, and then forwards, as instructed by the first processor 2002, the test packet to the second routing device 3000 based on path information in the test packet.

The second routing device 3000 may include a second network interface 3001 and a second processor 3002. The second network interface 3001 may be configured to communicate with another device, to forward data or a test packet. For example, the second network interface 3001 receives a test packet from the first routing device 2000, and then forwards, as instructed by the second processor 3002, the test packet to the first routing device 2000 based on path information in the test packet.

The measurement device 1000 may be a device capable of processing and sending a test packet, such as a server, a computer, a software-defined networking (Software Defined Network, SDN) controller, or a router, or may be a module integrated into the foregoing device. This is not limited in this embodiment of this application.

The measurement device 1000 may be further implemented by a board. For example, the measurement device may include a main control board and an interface board. The main control board includes a first processor and a first memory. The interface board may include an interface card. Optionally, the interface board may further include a second processor and a second memory. The main control board and the interface board are coupled.

The first memory may be configured to store program code of the main control board. The first processor is configured to invoke and execute the program code in the first memory, to generate a test packet and measure an available bandwidth on a to-be-measured link.

The interface card may be configured to send and receive data or a test packet, and is used as a network interface to communicate with an external device.

Optionally, the second memory may be configured to store program code of the interface board. The second processor is configured to invoke and execute the program code in the second memory, to send a received test packet to the main control board for processing.

In a possible implementation, an inter-process communication IPC control channel is established between the main control board and the interface board.

During bandwidth measurement, a maximum transmit bandwidth at a transmit end of a measurement device may be less than an available bandwidth on a to-be-measured link, and therefore the available bandwidth cannot be measured. In addition, an available bandwidth on another link on a test path may be less than the available bandwidth on the to-be-measured link, and a probe packet transmitted at a high bandwidth is congested on the another link. Consequently, a bandwidth on the to-be-measured link cannot be accurately measured either. Therefore, in the embodiments of this application, a quantity of SR label layers for the to-be-measured link in a test packet may be changed by using a segment routing (Segment Routing, SR) technology. When the quantity of SR label layers increases, times of forwarding the test packet on the to-be-measured link increase, and an occupied bandwidth also increases. When the quantity of SR label layers decreases, times of forwarding the test packet on the to-be-measured link decrease, and the occupied bandwidth also decreases. Therefore, a bandwidth can be accurately measured in the foregoing two cases.

With reference to FIG. 2 to FIG. 6, the following describes in detail a bandwidth measurement method in this application.

Figure 2:
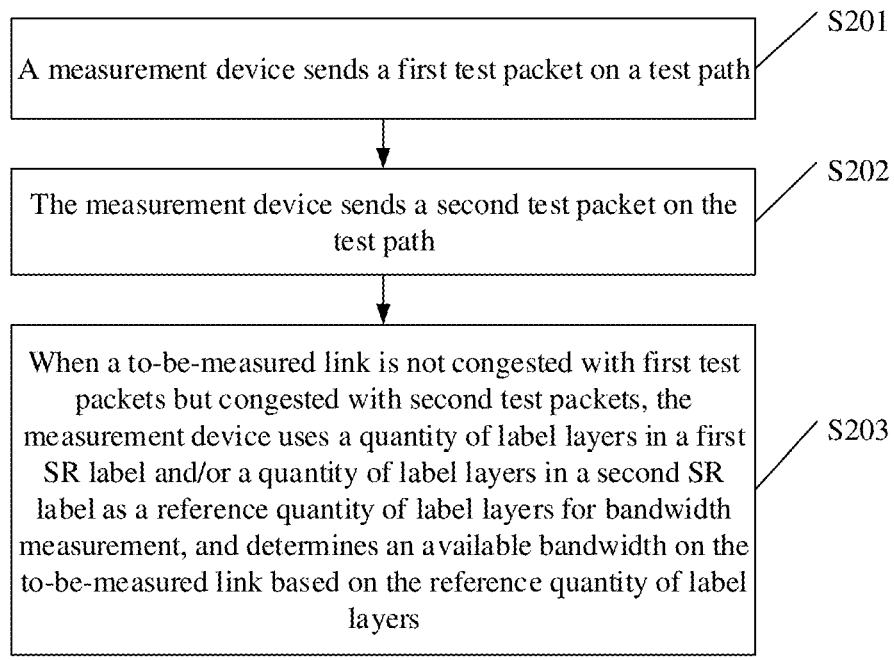
FIG. 2 is a schematic flowchart of a bandwidth measurement method according to an embodiment of this application.

FIG. 2 is a schematic flowchart of a bandwidth measurement method according to an embodiment of this application. The method may include the following steps.

S201: A measurement device sends a first test packet on a test path.

The first test packet includes a first segment routing SR label, the test path includes a to-be-measured link, and the first SR label indicates a forwarding relationship of the first test packet on the to-be-measured link.

For example, the to-be-measured link is a link between routing devices A and B, an SR label from the routing device A to the routing device B is $label_{AB}$, and an SR label from the routing device B to the routing device A is $label_{BA}$. In this case, the first SR label may include at least two SR labels forwarded between the two routing devices, and may be a label set for forwarding the first test packet on the to-be-measured link.

For example, when a quantity of SR label layers is equal to 1, the first SR label includes $label_{AB}$ and $label_{BA}$. In this case, the test packet is forwarded from the routing device A to the routing device B, and then from the routing device B to the routing device A.

When a quantity of SR label layers is equal to 2, the first SR label includes $label_{AB}$, $label_{BA}$, $label_{AB}$, and $label_{BA}$. To be specific, the test packet is forwarded from the routing device A to the routing device B, then forwarded from the routing device B to the routing device A, then forwarded from the routing device A to the routing device B, and then forwarded from the routing device B to the routing device A.

S202: The measurement device sends a second test packet on the test path.

The second test packet includes a second SR label, the second SR label indicates a forwarding relationship of the second test packet on the to-be-measured link, and the second SR label and the first SR label have different quantities of label layers.

For example, a quantity of label layers in the first SR label is equal to 2, and a quantity of label layers in the second SR label may be adjusted to 4 or 8 by dichotomy or in another manner based on the quantity of label layers in the first SR label. A bandwidth occupied by the test packet on the to-be-measured link is adjusted through adjustment of a quantity of label layers. The bandwidth occupied by the test packet on the to-be-measured link increases with an increase in the quantity of label layers, and decreases with a decrease in the quantity of label layers.

S203: When the to-be-measured link is not congested with first test packets but congested with second test packets, the measurement device uses the quantity of label layers in the first SR label and/or the quantity of label layers in the second SR label as a reference quantity of label layers for bandwidth measurement, and determines an available bandwidth on the to-be-measured link based on the reference quantity of label layers.

Optionally, the term "and/or" in this embodiment describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Therefore, optionally, in this embodiment of this application, the available bandwidth on the to-be-measured link may be determined based on the quantity of label layers in the first SR label. For example, the measurement device increases a transmit bandwidth for sending the first test packet until a difference between a current path delay and a first path delay in transmitting the first test packet is less than or equal to a preset delay difference, and then determines the available bandwidth on the to-be-measured link based on a current transmit bandwidth and the quantity of label layers in the first SR label.

Optionally, the available bandwidth on the to-be-measured link may be alternatively determined based on the quantity of label layers in the second SR label. For example, the measurement device reduces a transmit bandwidth for sending the second test packet until a difference between a current path delay and a second path delay in transmitting the second test packet is less than or equal to a preset delay difference, and then determines the available bandwidth on the to-be-measured link based on a current transmit bandwidth and the quantity of label layers in the second SR label.

Optionally, the available bandwidth on the to-be-measured link may be alternatively determined based on the quantity of label layers in the first SR label and the quantity of label layers in the second SR label. For example, the measurement device may determine an available bandwidth interval for the to-be-measured link based on the quantity of label layers in the first SR label and a first transmit bandwidth for sending the first test packet and the quantity of label layers in the second SR label and a second transmit bandwidth for sending the second test packet, and then select a median value of the available bandwidth interval as the available bandwidth on the to-be-measured link.

Optionally, a path delay of a test packet on the test path may be used to determine whether the to-be-measured link is congested. At the beginning of measurement, a path delay stays stable and roughly unchanged despite an increase in a quantity of SR label layers when the to-be-measured link is not congested. However, when the to-be-measured link becomes just congested with a further increase in the quantity of SR label layers, a path delay is greater than a path delay on a non-congested path and increases gradually. When the to-be-measured link is severely congested with the further increase in the quantity of SR label layers, a path delay may jump in order of magnitude.

Therefore, when sending the second test packet on the test path, the measurement device measures the second path delay in transmitting the second test packet on the test path, and determines whether congestion occurs when second test packets are sent.

When the second path delay is greater than a preset threshold, the measurement device determines that the to-be-measured link is congested with the second test packets.

The preset threshold herein may be set to a value far greater than a normal path delay based on an experiment or a simulation result. For example, the normal path delay is 10 ms when no congestion occurs, and the preset threshold may be set to 3 s. When the second path delay is greater than 3 s, congestion definitely occurs. Certainly, the preset threshold may be alternatively configured based on the normal path delay. For example, the preset threshold is set to a value, for example, 15 ms, greater than or equal to the normal path delay. When the second path delay is greater than 15 ms, congestion may occur. A specific value may be determined based on an actual status of the test path. This is not limited in this embodiment of this application.

Optionally, whether a link is congested may be alternatively determined by a variation or a variation rate of a current path delay relative to the normal path delay. For example, if a difference, namely, the variation, between the current path delay and the normal path delay is greater than a specific threshold, it is determined that the link is congested; or if a ratio of a difference between the current path delay and the normal path delay to the normal path delay is greater than a specific threshold, it is determined that the link is congested. This is not limited in this embodiment of this application either.

In this embodiment of this application, test packets with SR labels having different quantities of layers are sent to test the to-be-measured link, and different SR labels correspond to different forwarding relationships of test packets. A test packet can be forwarded for a plurality of times on the to-be-measured link by using segment routing and by changing a quantity of SR label layers. Therefore, when a maximum bandwidth at a transmit end is relatively small, a relatively large available bandwidth on the to-be-measured link is accurately measured. Further, a case in which a bandwidth on another link on the test path is relatively small but the available bandwidth on the to-be-measured link is relatively large can also be addressed by changing the quantity of SR label layers for the to-be-measured link. Therefore, a bandwidth on the to-be-measured link is accurately measured.

It should be noted that, in this embodiment of this application, for ease of description, an example in which a bandwidth on one to-be-measured link is measured is used for description. When the test path includes a plurality of to-be-measured links, measurement may also be performed by using the measurement method in this embodiment of this application. A quantity of SR label layers may be adjusted on only one of the to-be-measured links while quantities of SR label layers for the other to-be-measured links are fixed, and therefore measurement may be implemented on the plurality of to-be-measured links one by one. Alternatively, quantities of SR label layers may be simultaneously adjusted on the plurality of to-be-measured links, and each routing device independently measures a path delay to implement synchronous measurement on the plurality of to-be-measured links. This is not limited in this embodiment of this application.

Figure 3:
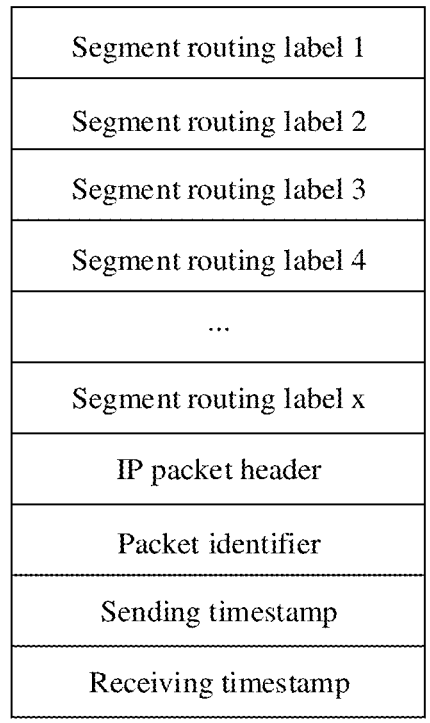
FIG. 3 is a schematic diagram of a format of a test packet used in a bandwidth measurement method according to an embodiment of this application.

FIG. 3 is a schematic diagram of a format of a test packet used in a bandwidth measurement method according to an embodiment of this application. The test packet may include path information, and the path information may include an SR label for each link on the test path. As shown in FIG. 3, the path information includes a segment routing label 1, a segment routing label 2, a segment routing label 3, a segment routing label 4, . . . , and a segment routing label x. There are a total of x SR labels.

Optionally, the path information may further include an IP packet header, where the IP packet header is used to carry a source IP address and a destination IP address of the test packet. When a link between the measurement device and a routing device that is the first to receive the test packet is not stored in the test packet as an SR label, the IP packet header may be used for forwarding the test packet on each routing device and returning the test packet to the measurement device, and the measurement device completes measurement.

When the link between the measurement device and the routing device that is the first to receive the test packet is stored in the test packet as an SR label, the IP packet header may not be stored.

Optionally, when a path delay needs to be measured to determine whether a to-be-measured link is congested, the test packet may further include delay measurement information, where the delay measurement information is used to measure a path delay in sending the test packet on the test path. The delay measurement information may include but is not limited to:

a packet identifier (ID), used by the measurement device to identify a test packet;

a sending timestamp, used to record a sending time at which the measurement device sends a test packet; and a receiving timestamp, used to record a receiving time at which the measurement device receives a test packet.

The path delay can be obtained by calculating a time difference between the sending time and the receiving time. Certainly, the path delay may be alternatively obtained by sending another packet such as an Internet Control Message Protocol (Internet Control Message Protocol, ICMP).

After the path delay is obtained, it may be determined whether the to-be-measured link is congested.

When the to-be-measured link is not congested with first test packets but congested with second test packets, it indicates that a congestion critical point is between a quantity of SR label layers corresponding to the first test packet and a quantity of SR label layers corresponding to the second test packet, where the congestion critical point indicates a critical location at which the to-be-measured link changes from non-congested to congested. In this case, the measurement device may determine an available bandwidth interval for the to-be-measured link based on a quantity of label layers in a first SR label and a quantity of label layers in a second SR label; and select a median value of the available bandwidth interval as an available bandwidth on the to-be-measured link.

For example, the quantity of label layers in the first SR label is equal to 2, the quantity of label layers in the second SR label is equal to 4, and a transmit rate, namely, a transmit bandwidth, at which the first test packet and the second test packet are transmitted is bw. In this case, [(2+4)/2]×bw, that is, 3×bw, may be used as an estimated value of the available bandwidth on the to-be-measured link.

Optionally, if a difference between the quantity of label layers in the second SR label and the quantity of label layers in the first SR label is equal to 1, it indicates that the congestion critical point corresponds to the quantity of label layers in the second SR label. In this case, the measurement device may use the quantity of label layers in the second SR label as a reference quantity of label layers, and determine the available bandwidth on the to-be-measured link based on the reference quantity of label layers.

Optionally, if a difference between the quantity of label layers in the second SR label and the quantity of label layers in the first SR label is greater than 1, it indicates that the congestion critical point is between the quantity of SR label layers corresponding to the first test packet and the quantity of SR label layers corresponding to the second test packet. To obtain a more accurate bandwidth measurement result, a quantity of label layers that is between the quantity of label layers in the first SR label and the quantity of label layers in the second SR label may be used for sending the test packet for further measurement.

Figure 4:
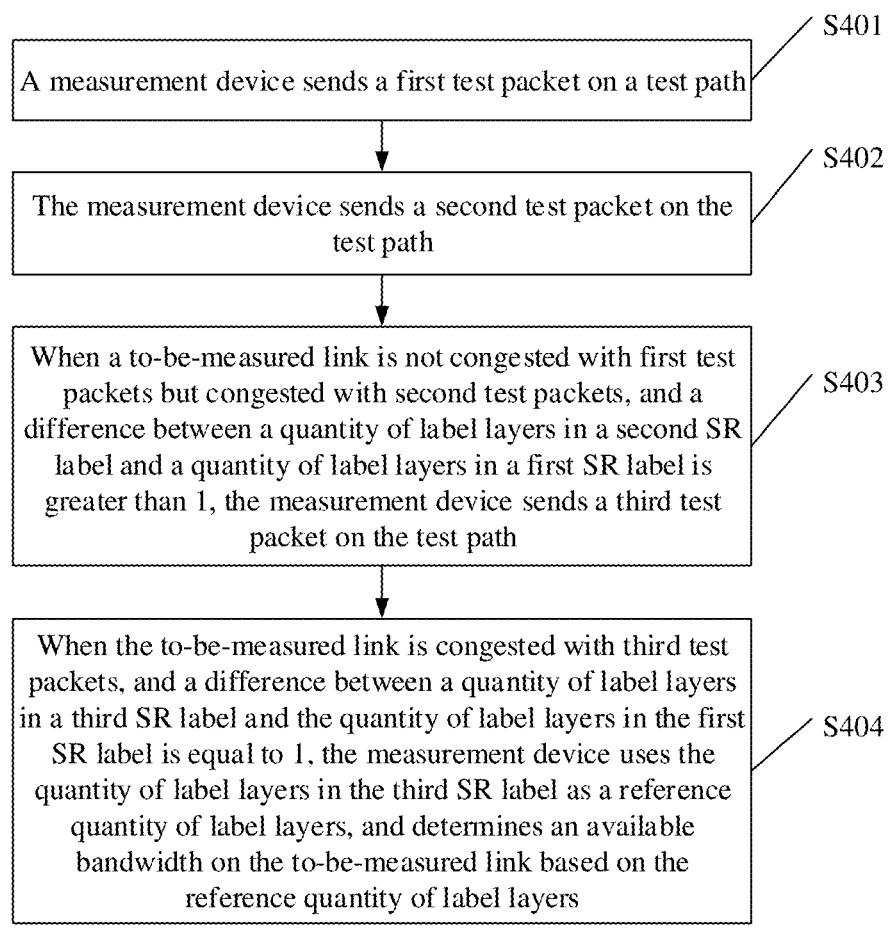
FIG. 4 is a schematic flowchart of another bandwidth measurement method according to an embodiment of this application.

For details, refer to FIG. 4. FIG. 4 is a schematic flowchart of another bandwidth measurement method according to an embodiment of this application. The method may include the following steps.

S401: A measurement device sends a first test packet on a test path.

The first test packet includes a first segment routing SR label, the test path includes a to-be-measured link, and the first SR label indicates a forwarding relationship of the first test packet on the to-be-measured link.

S402: The measurement device sends a second test packet on the test path.

The second test packet includes a second SR label, the second SR label indicates a forwarding relationship of the second test packet on the to-be-measured link, and the second SR label and the first SR label have different quantities of label layers.

S403: When the to-be-measured link is not congested with first test packets but congested with second test packets, and a difference between a quantity of label layers in the second SR label and a quantity of label layers in the first SR label is greater than 1, the measurement device sends a third test packet on the test path.

The third test packet includes a third SR label, the third SR label indicates a forwarding relationship of the third test packet on the to-be-measured link, and a quantity of label layers in the third SR label is greater than the quantity of label layers in the first SR label and less than the quantity of label layers in the second SR label.

S404: When the to-be-measured link is congested with third test packets, and a difference between the quantity of label layers in the third SR label and the quantity of label layers in the first SR label is equal to 1, the measurement device uses the quantity of label layers in the third SR label as a reference quantity of label layers, and determines an available bandwidth on the to-be-measured link based on the reference quantity of label layers.

Optionally, in the embodiments shown in FIG. 2 and FIG. 4, after determining the reference quantity of label layers, the measurement device may further determine a corresponding reference test packet based on the reference quantity of label layers, and reduce a transmit bandwidth for sending the reference test packet until a difference between a current path delay and a first path delay is less than or equal to a preset delay difference, where the first path delay is a path delay in transmitting the first test packet on the test path.

The measurement device determines the available bandwidth on the to-be-measured link based on the reference quantity of label layers and a current transmit bandwidth.

Certainly, if the test packet is not initially transmitted at a maximum transmit bandwidth, alternatively, a critical value of a quantity of label layers may be determined and subtracted by 1. Then, a transmit bandwidth is increased until a difference between a current path delay and a first path delay is less than or equal to a preset delay difference. The critical value of the quantity of label layers is a value of a quantity of label layers corresponding to a critical location at which the to-be-measured link changes from non-congested to congested.

It should be noted that the preset delay difference herein is a number that is greater than or equal to 0 and relatively close to 0. This is because a path delay may vary slightly even when there is no congestion. If such a slight variation is ignored, the transmit bandwidth for sending the reference test packet may be reduced until the current path delay is roughly the same as the first path delay.

Optionally, that the measurement device determines the available bandwidth on the to-be-measured link based on the reference quantity of label layers and a current transmit bandwidth may be performed based on the following formula:

$BW = n \times bw$, where

BW is the available bandwidth on the to-be-measured link, n is the reference quantity of label layers, and bw is the current transmit bandwidth of the measurement device.

Figure 5:
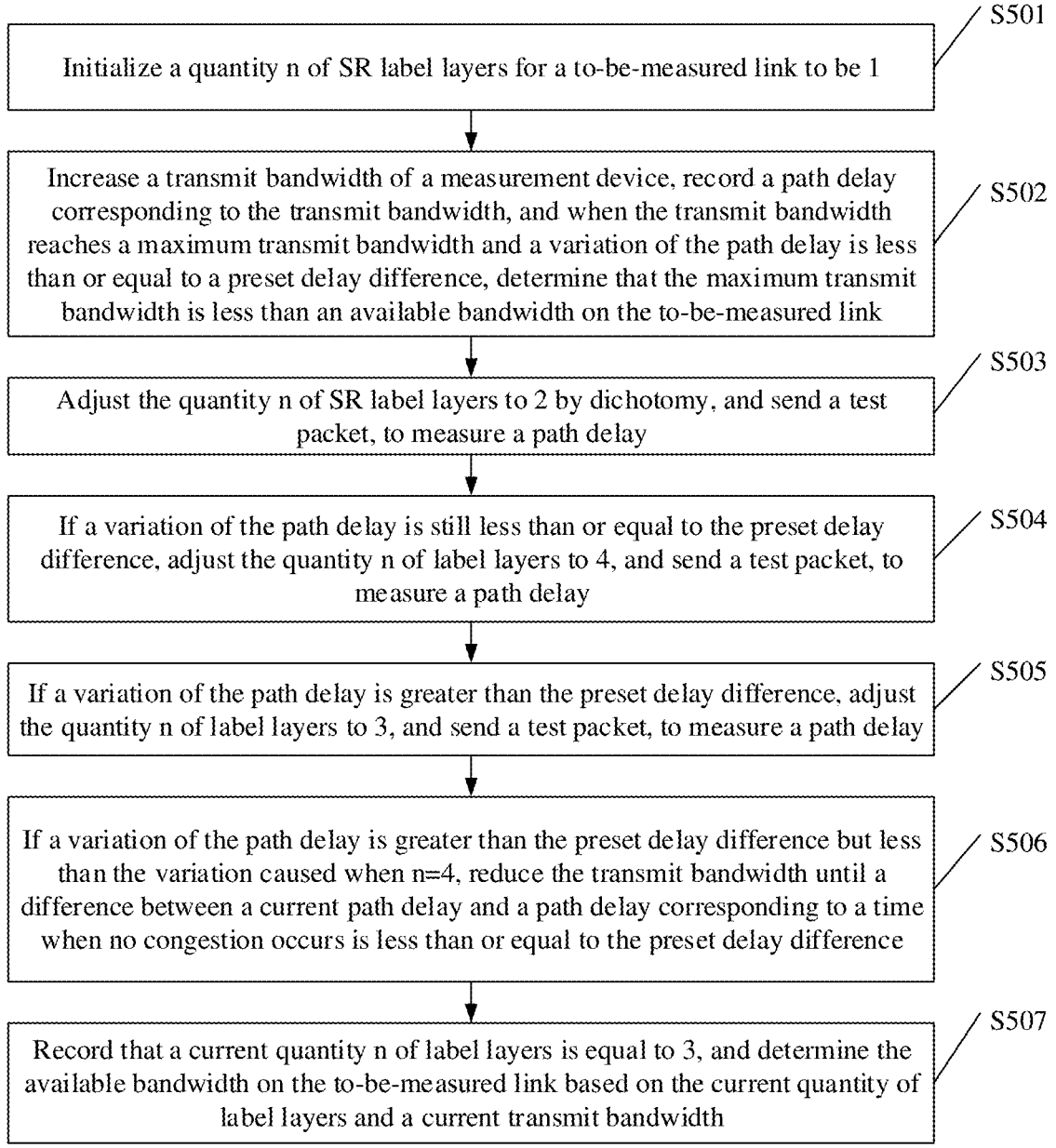
FIG. 5 is a schematic flowchart of still another bandwidth measurement method according to an embodiment of this application.

The bandwidth measurement method in the embodiments of this application may be compatible with an existing bandwidth measurement procedure. For example, when it is uncertain that a transmit bandwidth at a transmit end is less than an available bandwidth on a to-be-measured link, reference may be made to FIG. 5. FIG. 5 is a schematic flowchart of still another bandwidth measurement method according to an embodiment of this application. In the embodiment shown in FIG. 5, a maximum transmit bandwidth of a measurement device is 1 Mbit/s, an available bandwidth on a to-be-measured link is 3 Mbit/s, and a test path includes routing devices A and B. It is assumed that a label of a link AB is $label_{AB}$, and a label of a link BA is $label_{BA}$. A specific measurement process may include the following steps.

S501: Initialize a quantity n of SR label layers for the to-be-measured link to be 1.

In this case, information in an SR packet header of a test packet is <$label_{AB}$, $label_{BA}$>.

S502: Increase a transmit bandwidth of the measurement device, record a path delay corresponding to the transmit bandwidth, and when the transmit bandwidth reaches the maximum transmit bandwidth and a variation of the path delay is less than or equal to a preset delay difference, determine that the maximum transmit bandwidth is less than the available bandwidth on the to-be-measured link.

Herein, that the variation of the path delay is less than or equal to the preset delay difference may be understood as that the path delay is roughly unchanged or changes slightly, and it may be considered that the path delay basically stays unchanged.

S503: Adjust the quantity n of SR label layers to 2 by dichotomy (in this case, an SR packet header indicates <$label_{AB}$, $label_{BA}$, $label_{AB}$, $label_{BA}$>), and send a test packet, to measure a path delay.

Certainly, the quantity n of SR label layers may be alternatively adjusted by a preset quantity each time, where the preset quantity is greater than or equal to 1.

The quantity of label layers in step S503 may be used as the quantity of label layers in the first SR label in the embodiment in FIG. 2. Optionally, the quantity of label layers in step S501 may also be used as the quantity of label layers in the first SR label in the embodiment in FIG. 2. When a more accurate measurement result needs to be obtained, the quantity of label layers in step S501 may be further increased to a value n that is close to but less than a congestion critical point.

S504: If a variation of the path delay is still less than or equal to the preset delay difference, adjust the quantity n of label layers to 4 (in this case, an SR packet header indicates <$label_{AB}$, $label_{BA}$, $label_{AB}$, $label_{BA}$, $label_{AB}$, $label_{BA}$, $label_{AB}$, $label_{BA}$>), and send a test packet, to measure a path delay.

S505: If a variation of the path delay is greater than the preset delay difference, adjust the quantity n of label layers to 3 (in this case, an SR packet header indicates <$label_{AB}$, $label_{BA}$, $label_{AB}$, $label_{BA}$, $label_{AB}$, $label_{BA}$>), and send a test packet, to measure a path delay.

The quantity of label layers in step S504 and the quantity of label layers in S505 each may be used as the quantity of label layers in the second SR label in the embodiment in FIG. 2. Further, the quantity of label layers in S504 may correspond to a case in which a difference between the quantity of label layers in the second SR label and the quantity of label layers in the first SR label is greater than 1, and the quantity of label layers in S505 may correspond to a case in which a difference between the quantity of label layers in the second SR label and the quantity of label layers in the first SR label is equal to 1.

S506: If a variation of the path delay is greater than the preset delay difference but less than the variation caused when n=4, reduce the transmit bandwidth until a difference between a current path delay and a path delay corresponding to a time when no congestion occurs is less than or equal to the preset delay difference.

S507: Record that a current quantity n of label layers is equal to 3, and determine the available bandwidth on the to-be-measured link based on the current quantity of label layers and a current transmit bandwidth.

For example, the current quantity n of label layers is equal to 3, and the current transmit bandwidth is 0.99 Mbit/s. In this case, the available bandwidth BW on the to-be-measured link is 3×0.99 Mbit/s, that is, approximately 3 Mbit/s.

Optionally, step S502 may also be performed after a value n corresponding to the congestion critical point at which the to-be-measured link is congested is determined and subtracted by 1.

In step S506, when n=3, and the variation of the path delay is less than or equal to the preset delay difference, n=4 may be recorded in step S507, and the transmit bandwidth may be reduced to determine the available bandwidth on the to-be-measured link.

Certainly, the foregoing steps are merely used as examples for description. During bandwidth measurement, in addition to being first increased and then decreased, n may be first set to a relatively large value and then decreased to approach the congestion critical point. Finally, the transmit bandwidth is reduced to perform bandwidth measurement. Alternatively, n may be separately set to a relatively small value and a relatively large value, and is adjusted, based on the relatively small value and the relatively large value, to approach the congestion critical point for measurement. This is not limited in this embodiment of this application.

Figure 6:
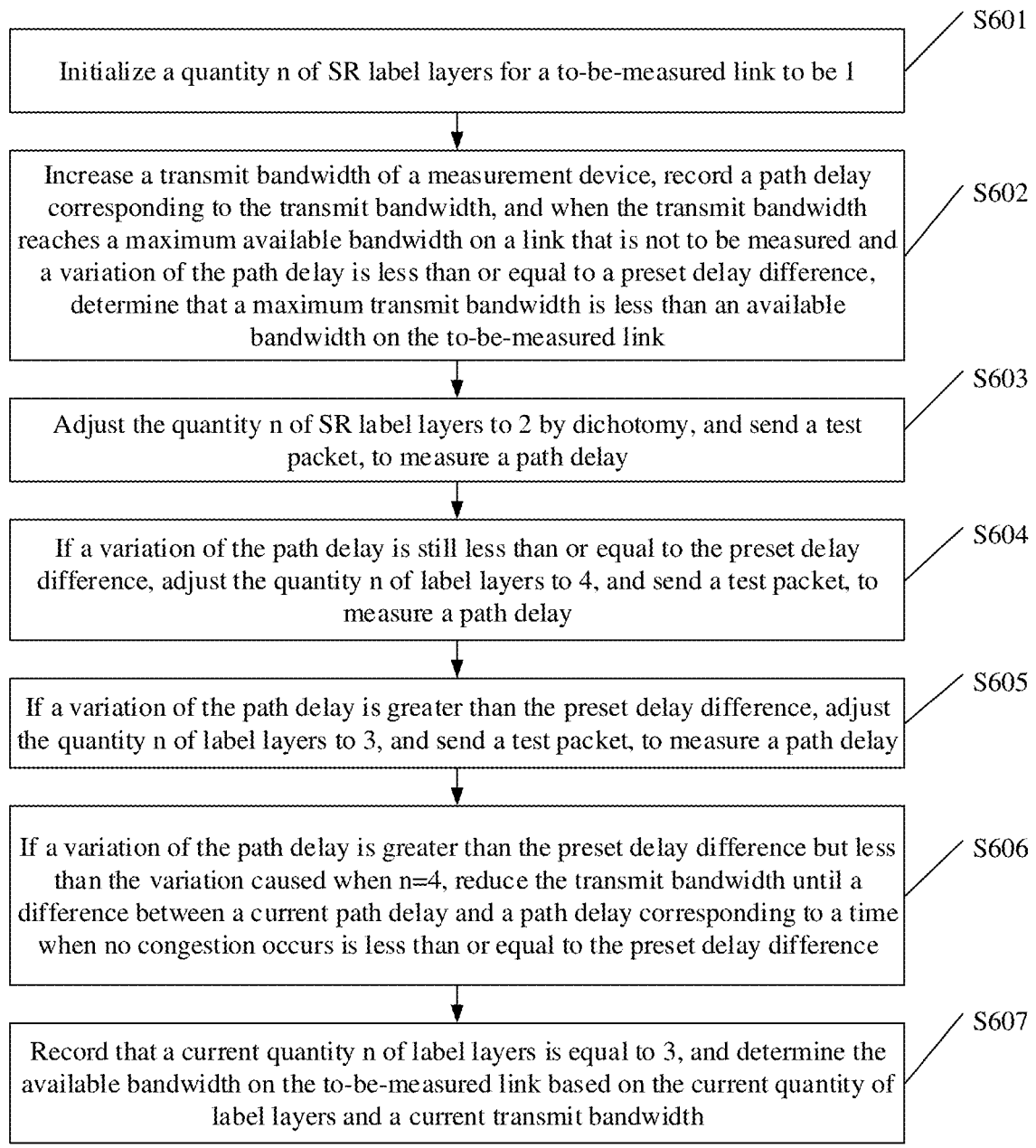
FIG. 6 is a schematic flowchart of still another bandwidth measurement method according to an embodiment of this application.

For another example, when an available bandwidth on another link on a test path is less than an available bandwidth on a to-be-measured link, bandwidth measurement may be performed with reference to FIG. 6. FIG. 6 is a schematic flowchart of still another bandwidth measurement method according to an embodiment of this application. An available (remaining) bandwidth on a link AB on a measurement path is 1 Mbit/s, which is less than an available bandwidth 3 Mbit/s on a to-be-measured link. It is assumed that a label of the link AB is $label_{AB}$, a label of a link BA is $label_{BA}$, a label of a link BC is $label_{BC}$, and a label of a link CB is $label_{CB}$. Available bandwidths on the link AB and the link BA are the same, and are 1 Mbit/s. To prevent the link AB and the link BA from being congested, a transmit bandwidth of a measurement device should be less than or equal to 1 Mbit/s. Specifically, the following steps may be included:

S601: Initialize a quantity n of SR label layers for the to-be-measured link to be 1.

In this case, information in an SR packet header of a test packet is <$label_{AB}$, $label_{BC}$, $label_{CB}$, $label_{BA}$>.

S602: Increase the transmit bandwidth of the measurement device, record a path delay corresponding to the transmit bandwidth, and when the transmit bandwidth reaches a maximum available bandwidth of 1 Mbit/s on a link that is not to be measured and a variation of the path delay is less than or equal to a preset delay difference, determine that a maximum transmit bandwidth is less than the available bandwidth on the to-be-measured link.

Herein, that the variation of the path delay is less than or equal to the preset delay difference may be understood as that the path delay is roughly unchanged or changes slightly, and it may be considered that the path delay basically stays unchanged.

S603: Adjust the quantity n of SR label layers to 2 by dichotomy (in this case, an SR packet header indicates <$label_{AB}$, $label_{BC}$, $label_{CB}$, $label_{BC}$, $label_{CB}$, $label_{BA}$>), and send a test packet, to measure a path delay.

Certainly, the quantity n of SR label layers may be alternatively adjusted by a preset quantity each time, where the preset quantity is greater than or equal to 1.

The quantity of label layers in step S603 may be used as the quantity of label layers in the first SR label in the embodiment in FIG. 2. Optionally, the quantity of label layers in step S601 may also be used as the quantity of label layers in the first SR label in the embodiment in FIG. 2. When a more accurate measurement result needs to be obtained, the quantity of label layers in step S601 may be further increased to a value n that is close to but less than a congestion critical point.

S604: If a variation of the path delay is still less than or equal to the preset delay difference, adjust the quantity n of label layers to 4 (in this case, an SR packet header indicates <$label_{AB}$, $label_{BC}$, $label_{CB}$, $label_{BC}$, $label_{CB}$, $label_{BC}$, $label_{CB}$, $label_{BC}$, $label_{CB}$, $label_{BA}$,>), and send a test packet, to measure a path delay.

S605: If a variation of the path delay is greater than the preset delay difference, adjust the quantity n of label layers to 3 (in this case, an SR packet header indicates <$label_{AB}$, $label_{BC}$, $label_{CB}$, $label_{BC}$, $label_{CB}$, $label_{BC}$, $label_{CB}$, $label_{BA}$>), and send a test packet, to measure a path delay.

The quantity of label layers in step S604 and the quantity of label layers in S605 each may be used as the quantity of label layers in the second SR label in the embodiment in FIG. 2. Further, the quantity of label layers in S604 may correspond to a case in which a difference between the second SR label and the first SR label is greater than 1, and the quantity of label layers in S605 may correspond to a case in which a difference between the second SR label and the first SR label is equal to 1.

S606: If a variation of the path delay is greater than the preset delay difference but less than the variation caused when n=4, reduce the transmit bandwidth until a difference between a current path delay and a path delay corresponding to a time when no congestion occurs is less than or equal to the preset delay difference.

S607: Record that a current quantity n of label layers is equal to 3, and determine the available bandwidth on the to-be-measured link based on the current quantity of label layers and a current transmit bandwidth.

For example, the current quantity n of label layers is equal to 3, and the current transmit bandwidth is 0.99 Mbit/s. In this case, the available bandwidth BW on the to-be-measured link is 3×0.99 Mbit/s, that is, approximately 3 Mbit/s.

Optionally, step 602 may also be performed after a value n corresponding to the congestion critical point at which the to-be-measured link is congested is determined and subtracted by 1.

In step S606, when n=3, and the variation of the path delay is less than or equal to the preset delay difference, n=4 may be recorded in step S607, and the transmit bandwidth may be reduced to determine the available bandwidth on the to-be-measured link.

Certainly, the foregoing steps are merely used as examples for description. During bandwidth measurement, in addition to being first increased and then decreased, n may be first set to a relatively large value and then decreased to approach the congestion critical point. Finally, the transmit bandwidth is reduced to perform bandwidth measurement. Alternatively, n may be separately set to a relatively small value and a relatively large value, and is adjusted, based on the relatively small value and the relatively large value, to approach the congestion critical point for measurement. This is not limited in this embodiment of this application.

It should be noted that the foregoing embodiment mainly describes a case in which available bandwidths in both directions on the to-be-measured link are the same. For example, available bandwidths on the link AB and the link BA are the same. When the available bandwidths on the link AB and the link BA are different, a manner of increasing the quantity of SR label layers in this embodiment of this application may also be used to perform measurement. For example, a test path includes routing devices A, B, and C, and a link BC is a to-be-measured link. In this case, the three routing devices may be used to form a triangle unidirectional circulation loop for forwarding a test packet, that is, link AB-link BC-link CA. Then, quantities of SR label layers for the links in the unidirectional circulation loop are simultaneously adjusted. For example, when the quantities of label layers are adjusted from 1 to 2, the unidirectional circulation loop changes to link AB-link BC-link CA-link AB-link BC-link CA, and an SR packet header in corresponding path information is: <$label_{AB}$, $label_{BC}$, $label_{CA}$, $label_{AB}$, $label_{BC}$, $label_{CA}$>. When available bandwidths on the link AB and the link CA are greater than an available bandwidth on the to-be-measured link BC, the to-be-measured link BC becomes congested earlier than the link AB and the link CA as the quantities of label layers increase. In this case, the manner in this embodiment of this application may be used to determine the available bandwidth on the to-be-measured link BC. When the available bandwidths on the link AB and the link CA are equal to the available bandwidth on the to-be-measured link BC, the to-be-measured link BC, the link AB, and the link CA are simultaneously congested as the quantities of label layers increase. In this case, the manner in this embodiment of this application may also be used to determine the available bandwidth on the to-be-measured link BC. A measurement manner is similar when more than three routing devices are used to form a unidirectional circulation loop. Details are not described herein again.

Optionally, in addition to the unidirectional circulation loop, there may be one or more routing devices that perform bidirectional forwarding. For example, there is further a routing device D. When the quantities of label layers in the unidirectional circulation loop are not increased, path information is link DA-(link AB-link BC-link CA)-link AD, where path information in the brackets indicates the unidirectional circulation loop. When the quantities of label layers in the unidirectional circulation loop are adjusted to 2, path information is: link DA-(link AB-link BC-link CA-link AB-link BC-link CA)-link AD. When there are a plurality of routing devices that perform bidirectional forwarding, a similar processing manner is used, and details are not described herein again.

Figure 7:
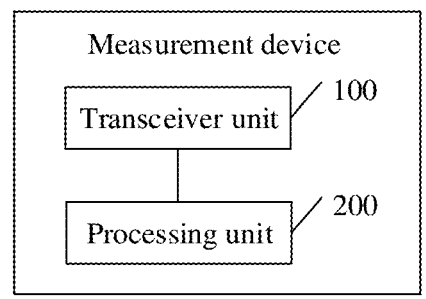
FIG. 7 is a schematic diagram of composition of a measurement device according to an embodiment of this application.

FIG. 7 is a schematic diagram of composition of a measurement device according to an embodiment of this application. The measurement device may include a transceiver unit 100 and a processing unit 200.

The transceiver unit 100 is configured to send a first test packet on a test path, where the first test packet includes a first segment routing SR label, the test path includes a to-be-measured link, and the first SR label indicates a forwarding relationship of the first test packet on the to-be-measured link.

The transceiver unit 100 is further configured to send a second test packet on the test path, where the second test packet includes a second SR label, the second SR label indicates a forwarding relationship of the second test packet on the to-be-measured link, and the second SR label and the first SR label have different quantities of label layers.

The processing unit 200 is configured to: when the to-be-measured link is not congested with first test packets but congested with second test packets, use a quantity of label layers in the first SR label and/or a quantity of label layers in the second SR label as a reference quantity of label layers for bandwidth measurement, and determine an available bandwidth on the to-be-measured link based on the reference quantity of label layers Optionally, the processing unit 200 is further configured to:

when the second test packet is sent on the test path, measure a second path delay in transmitting the second test packet on the test path; and when the second path delay is greater than a preset threshold, determine that the to-be-measured link is congested with second test packets.

Optionally, the processing unit 200 is further configured to:

if a difference between the quantity of label layers in the second SR label and the quantity of label layers in the first SR label is equal to 1, use the quantity of label layers in the second SR label as the reference quantity of label layers, and determine an available bandwidth on the to-be-measured link based on the reference quantity of label layers.

Optionally, the transceiver unit 100 is further configured to:

if a difference between the quantity of label layers in the second SR label and the quantity of label layers in the first SR label is greater than 1, send a third test packet on the test path, where the third test packet includes a third SR label, the third SR label indicates a forwarding relationship of the third test packet on the to-be-measured link, and a quantity of label layers in the third SR label is greater than the quantity of label layers in the first SR label and less than the quantity of label layers in the second SR label.

The processing unit 200 is further configured to: when the to-be-measured link is congested with third test packets, and a difference between the quantity of label layers in the third SR label and the quantity of label layers in the first SR label is equal to 1, use the quantity of label layers in the third SR label as the reference quantity of label layers, and determine an available bandwidth on the to-be-measured link based on the reference quantity of label layers.

Optionally, the processing unit 200 is further configured to:

determine a corresponding reference test packet based on the reference quantity of label layers, and reduce a transmit bandwidth for sending the reference test packet until a difference between a current path delay and a first path delay is less than or equal to a preset delay difference, where the first path delay is a path delay in transmitting the first test packet on the test path; and determine the available bandwidth on the to-be-measured link based on the reference quantity of label layers and a current transmit bandwidth.

Optionally, that the processing unit 200 determines the available bandwidth on the to-be-measured link based on the reference quantity of label layers and a current transmit bandwidth is performed based on the following formula:

$$BW = n \times bw, \text{ where}$$

BW is the available bandwidth on the to-be-measured link, n is the reference quantity of label layers, and bw is the current transmit bandwidth of the measurement device.

Optionally, the processing unit 200 is further configured to:

determine an available bandwidth interval for the to-be-measured link based on the quantity of label layers in the first SR label and the quantity of label layers in the second SR label; and select a median value of the available bandwidth interval as the available bandwidth on the to-be-measured link.

For concepts, explanations, detailed descriptions, and other steps that are related to the measurement device and that are related to the technical solutions provided in the embodiments of this application, refer to descriptions about the content in the foregoing method embodiments. Details are not described herein again.

Figure 8:
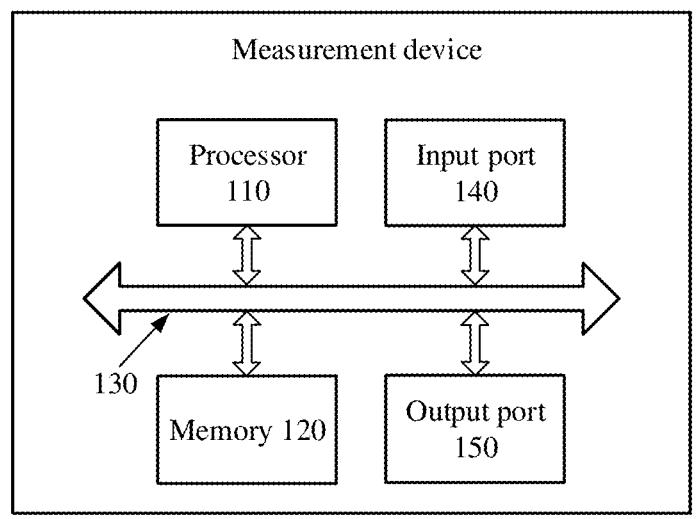
FIG. 8 is a schematic diagram of composition of still another measurement device according to an embodiment of this application.

FIG. 8 is a schematic diagram of composition of another measurement device according to an embodiment of this application. As shown in FIG. 8, a measurement device may include a processor 110, a memory 120, and a bus 130. The processor 110 is connected to the memory 120 by using the bus 130. The memory 120 is configured to store an instruction. The processor 110 is configured to execute the instruction stored in the memory 120, to implement the steps in the methods corresponding to FIG. 2 to FIG. 6.

Further, the measurement device may further include an input port 140 and an output port 150. The processor 110, the memory 120, the input port 140, and the output port 150 may be connected by using the bus 130.

The processor 110 is configured to execute the instruction stored in the memory 120, to control the input port 140 to receive a signal and a test packet and control the output port 150 to send a signal and a test packet, thereby completing the steps performed by the measurement device in the foregoing methods. The input port 140 and the output port 150 may be a same physical entity or different physical entities. When the input port 140 and the output port 150 are the same physical entity, the input port 140 and the output port 150 may be collectively referred to as an input/output port. The memory 120 may be integrated into the processor 110, or may be separated from the processor 110.

In an implementation, it may be considered that functions of the input port 140 and the output port 150 are implemented by a transceiver circuit or a dedicated transceiver chip. It may be considered to implement the processor 110 by using a dedicated processing chip, a processing circuit, a processor, or a general-purpose chip.

In another implementation, it may be considered to implement the measurement device provided in this embodiment of this application in a manner of using a general-purpose computer. To be specific, program code that implements functions of the processor 110, the input port 140, and the output port 150 is stored in the memory, and a general-purpose processor implements the functions of the processor 110, the input port 140, and the output port 150 by executing the code in the memory.

In another implementation, it may be considered to implement the measurement device provided in this embodiment of this application in a manner of using a board. To be specific, a main control board and an interface board that are coupled are configured. The processor 110 and the memory 120 may be configured on the main control board, and the input port 140 and the output port 150 are configured on the interface board. The main control board executes a program to generate a test packet, and completes bandwidth measurement, and the interface board is configured to send and receive a test packet. Optionally, the memory 120 may be alternatively configured on the interface board.

For concepts, explanations, detailed descriptions, and other steps that are related to the measurement device and that are related to the technical solutions provided in the embodiments of this application, refer to descriptions about the content in the foregoing methods or other embodiments. Details are not described herein again.

A person skilled in the art may understand that for ease of description, FIG. 8 shows only one memory and one processor. Actually, a measurement device may include a plurality of processors and a plurality of memories. The memory may also be referred to as a storage medium, a storage device, or the like. This is not limited in this embodiment of this application. In the embodiment of this application, the processor may be a central processing unit (Central Processing Unit, "CPU" for short), or the processor may be another general purpose processor, a digital signal processor (DSP), an application-specific integrated circuit (ASIC), a field programmable gate array (FPGA), or another programmable logic device, a discrete gate or a transistor logic device, a discrete hardware component, or the like. The general purpose processor may be a microprocessor, or the processor may be any conventional processor or the like. The memory may include a read-only memory and a random access memory, and provide an instruction and data to the processor. A part of the memory may further include a nonvolatile random access memory. The bus may further include a power bus, a control bus, a status signal bus, and the like, in addition to a data bus. However, for clear description, various types of buses in the figure are marked as the bus.

According to the method and the measurement device provided in the embodiments of this application, an embodiment of this application further provides a computer system, including a CPU, a controller, and a storage medium. For a relationship between the CPU, the controller, and the storage medium and an instruction procedure, refer to descriptions and explanations of the embodiments in FIG. 1 to FIG. 6. Details are not described herein again.

It should be understood that sequence numbers of the foregoing processes do not mean execution sequences in various embodiments of this application. The execution sequences of the processes should be determined based on functions and internal logic of the processes, and should not be construed as any limitation on implementation processes of the embodiments of this application.

A person of ordinary skill in the art may be aware that, in combination with illustrative logical blocks (illustrative logical block) and steps (step) described in the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by some interfaces. The indirect couplings or communication connections between the apparatuses or units may be implemented in electronic, mechanical, or other forms.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A bandwidth measurement method, comprising:
    sending, by a measurement device, a first test packet on a test path, wherein the first test packet comprises a first segment routing (SR) label, the test path comprises a to-be-measured link, and the first SR label indicating a forwarding relationship of the first test packet on the to-be-measured link;
    sending, by the measurement device, a second test packet on the test path, wherein the second test packet comprises a second SR label, the second SR label indicating a forwarding relationship of the second test packet on the to-be-measured link, and the second SR label and the first SR label having different quantities of label layers; and
    setting, by the measurement device, at least one of a quantity of label layers in the first SR label or a quantity of label layers in the second SR label as a reference quantity of label layers for bandwidth measurement, and determining an available bandwidth on the to-be-measured link based on the reference quantity of label layers in response to the to-be-measured link failing to be congested with first test packets and being congested with second test packets.

2. The method according to claim 1, wherein the method further comprises:
    measuring, by the measurement device, a second path delay of the second test packet on the test path in response to sending the second test packet on the test path; and
    determining, by the measurement device, that the to-be-measured link is congested with second test packets in response to the second path delay being greater than a preset threshold.

3. The method according to claim 1, wherein the method further comprises:
    setting, by the measurement device, the quantity of label layers in the second SR label as the reference quantity of label layers in response to a difference between the quantity of label layers in the second SR label and the quantity of label layers in the first SR label being equal to 1.

4. The method according to claim 1, wherein the method further comprises:
    sending, by the measurement device, a third test packet on the test path in response to a difference between the quantity of label layers in the second SR label and the quantity of label layers in the first SR label being greater than 1, wherein the third test packet comprises a third SR label, the third SR label indicating a forwarding relationship of the third test packet on the to-be-measured link, and a quantity of label layers in the third SR label is greater than the quantity of label layers in the first SR label and less than the quantity of label layers in the second SR label; and
    setting, by the measurement device, the quantity of label layers in the third SR label as the reference quantity of label layers in response to the to-be-measured link being congested with third test packets, and a difference between the quantity of label layers in the third SR label and the quantity of label layers in the first SR label is equal to 1.

5. The method according to claim 1, wherein the method further comprises:
    determining, by the measurement device, a corresponding reference test packet based on the reference quantity of label layers, and reducing a transmission bandwidth for sending the reference test packet until a difference between a current path delay and a first path delay is less than or equal to a preset delay difference, wherein the first path delay is a path delay of the first test packet on the test path; and
    determining, by the measurement device, the available bandwidth on the to-be-measured link based on the reference quantity of label layers and a current transmission bandwidth.

6. The method according to claim 5, wherein the determining, by the measurement device, the available bandwidth on the to-be-measured link based on the reference quantity of label layers and the current transmit bandwidth is performed based on the following formula:

$$BW = n \times bw, \text{wherein}$$

BW is the available bandwidth on the to-be-measured link, n is the reference quantity of label layers, and bw is the current transmission bandwidth of the measurement device.

7. The method according to claim 1, wherein the setting, by the measurement device, at least the quantity of label layers in the first SR label or the quantity of label layers in the second SR label as the reference quantity of label layers for bandwidth measurement, and determining the available bandwidth on the to-be-measured link based on the reference quantity of label layers comprises:

determining, by the measurement device, an available bandwidth interval for the to-be-measured link based on the quantity of label layers in the first SR label and the quantity of label layers in the second SR label; and selecting a median value of the available bandwidth interval as the available bandwidth on the to-be-measured link.

8. A measurement device, comprising:
a transceiver, configured to:
send a first test packet on a test path, wherein the first test packet comprises a first segment routing (SR) label, the test path comprises a to-be-measured link, and the first SR label indicating a forwarding relationship of the first test packet on the to-be-measured link; and
send a second test packet on the test path, wherein the second test packet comprises a second SR label, the second SR label indicating a forwarding relationship of the second test packet on the to-be-measured link, and the second SR label and the first SR label having different quantities of label layers; and
processor, configured to:
set at least one of a quantity of label layers in the first SR label or a quantity of label layers in the second SR label as a reference quantity of label layers for bandwidth measurement, and determine an available bandwidth on the to-be-measured link based on the reference quantity of label layers in response to the to-be-measured link failing to be congested with first test packets and being congested with second test packets.

9. The measurement device according to claim 8, wherein the processor is further configured to:
measure a second path delay of the second test packet on the test path in response to the second test packet being sent on the test path; and
determine that the to-be-measured link is congested with second test packets in response to the second path delay being greater than a preset threshold.

10. The measurement device according to claim 8, wherein the processor is further configured to:
set the quantity of label layers in the second SR label as the reference quantity of label layers in response to a difference between the quantity of label layers in the second SR label and the quantity of label layers in the first SR label being equal to 1.

11. The measurement device according to claim 8, wherein
the transceiver is further configured to:
send a third test packet on the test path in response to a difference between the quantity of label layers in the second SR label and the quantity of label layers in the first SR label being greater than 1, wherein the third test packet comprises a third SR label, the third SR label indicating a forwarding relationship of the third test packet on the to-be-measured link, and a quantity of label layers in the third SR label is greater than the quantity of label layers in the first SR label and less than the quantity of label layers in the second SR label; and
the processor is further configured to:
set the quantity of label layers in the third SR label as the reference quantity of label layers in response to the to-be-measured link being congested with third test packets, and a difference between the quantity of label layers in the third SR label and the quantity of label layers in the first SR label is equal to 1.

12. The measurement device according to claim 8, wherein the processor is further configured to:
determine a corresponding reference test packet based on the reference quantity of label layers, and reduce a transmission bandwidth for sending the reference test packet until a difference between a current path delay and a first path delay is less than or equal to a preset delay difference, wherein the first path delay is a path delay of the first test packet on the test path; and
determine the available bandwidth on the to-be-measured link based on the reference quantity of label layers and a current transmission bandwidth.

13. The measurement device according to claim 12, wherein the processor configured to determine the available bandwidth on the to-be-measured link based on the reference quantity of label layers and the current transmission bandwidth is performed based on the following formula:

$$BW = n \times bw, \text{ wherein}$$

BW is the available bandwidth on the to-be-measured link, n is the reference quantity of label layers, and bw is the current transmission bandwidth of the measurement device.

14. The measurement device according to claim 8, wherein the processor is further configured to:
determine an available bandwidth interval for the to-be-measured link based on the quantity of label layers in the first SR label and the quantity of label layers in the second SR label; and
select a median value of the available bandwidth interval as the available bandwidth on the to-be-measured link.

15. A non-transitory computer-readable storage medium, wherein the non-transitory computer-readable storage medium stores an instruction, and the instruction causes a computer to execute a method, the method comprising:
sending a first test packet on a test path, wherein the first test packet comprises a first segment routing (SR) label, the test path comprises a to-be-measured link, and the first SR label indicating a forwarding relationship of the first test packet on the to-be-measured link;
sending a second test packet on the test path, wherein the second test packet comprises a second SR label, the second SR label indicating a forwarding relationship of the second test packet on the to-be-measured link, and the second SR label and the first SR label having different quantities of label layers; and
setting at least one of a quantity of label layers in the first SR label or a quantity of label layers in the second SR label as a reference quantity of label layers for bandwidth measurement, and determining an available bandwidth on the to-be-measured link based on the reference quantity of label layers in response to the to-be-measured link failing to be congested with first test packets and being congested with second test packets.

16. The non-transitory computer-readable storage medium according to claim 15, wherein the instruction causes the computer to execute the method, the method further comprising:
measuring a second path delay of the second test packet on the test path in response to sending the second test packet on the test path; and determining that the to-be-measured link is congested with second test packets in response to the second path delay being greater than a preset threshold.

17. The non-transitory computer-readable storage medium according to claim 15, wherein the instruction causes the computer to execute the method, the method further comprising:

setting the quantity of label layers in the second SR label as the reference quantity of label layers in response to a difference between the quantity of label layers in the second SR label and the quantity of label layers in the first SR label being equal to 1.

18. The non-transitory computer-readable storage medium according to claim 15, wherein the instruction causes the computer to execute the method, the method further comprising:

sending a third test packet on the test path in response to a difference between the quantity of label layers in the second SR label and the quantity of label layers in the first SR label being greater than 1, wherein the third test packet comprises a third SR label, the third SR label indicating a forwarding relationship of the third test packet on the to-be-measured link, and a quantity of label layers in the third SR label is greater than the quantity of label layers in the first SR label and less than the quantity of label layers in the second SR label; and setting the quantity of label layers in the third SR label as the reference quantity of label layers in response to the to-be-measured link being congested with third test packets, and a difference between the quantity of label layers in the third SR label and the quantity of label layers in the first SR label is equal to 1.

19. The non-transitory computer-readable storage medium according to claim 15, wherein the instruction causes the computer to execute the method, the method further comprising:

determining a corresponding reference test packet based on the reference quantity of label layers, and reducing a transmission bandwidth for sending the reference test packet until a difference between a current path delay and a first path delay is less than or equal to a preset delay difference, wherein the first path delay is a path delay of the first test packet on the test path; and determining the available bandwidth on the to-be-measured link based on the reference quantity of label layers and a current transmission bandwidth.

20. The non-transitory computer-readable storage medium according to claim 19, wherein the instruction causes the computer to execute the method, the method comprising the determining the available bandwidth on the to-be-measured link based on the reference quantity of label layers and the current transmit bandwidth is performed based on the following formula:

$$BW = n \times bw, \text{ wherein}$$

BW is the available bandwidth on the to-be-measured link, n is the reference quantity of label layers, and bw is the current transmission bandwidth of the measurement device.

* * * * *